Sept. 13, 1927.  
F. VON DER HORST  
1,641,998  
APPARATUS FOR AND METHOD OF HANDLING ROLLS  
Filed May 17, 1924  
6 Sheets-Sheet 2

Inventor:  
Frederick Von der Horst,  
by Wallace R. Lane.  
Atty.

Sept. 13, 1927.

F. VON DER HORST 1,641,998

APPARATUS FOR AND METHOD OF HANDLING ROLLS

Filed May 17, 1924     6 Sheets-Sheet 3

Inventor:
Frederick Von der Horst,
by Wallace R. Lane.

Atty.

Sept. 13, 1927.  F. VON DER HORST  1,641,998
APPARATUS FOR AND METHOD OF HANDLING ROLLS
Filed May 17, 1924   6 Sheets-Sheet 4

Inventor:
Frederick von der Horst,
by Wallace R. Lane.
Atty.

Patented Sept. 13, 1927.

1,641,998

UNITED STATES PATENT OFFICE.

FREDERICK VON DER HORST, OF OAK PARK, ILLINOIS.

APPARATUS FOR AND METHOD OF HANDLING ROLLS.

Application filed May 17, 1924. Serial No. 713,937.

The present invention relates to the handling of rolls, such as paper rolls for printing plants.

Printing paper rolls are heavy and cumbersome and in their course from the railroad car, motor truck or ship delivering them at the plant, to the printing press, they require considerable handling with the attendant high cost and consumption of time and labor. Among the objects of the present invention is to reduce the cost, time and labor of and for such course of the rolls as well as to provide novel means and methods of handling the rolls to the end of obtaining increased efficiency at the expense of as little labor and energy as possible; to provide for receiving the rolls on a given level, such as a platform or pier at the ground or first floor level, and transferring the rolls by novel means, to floors at lower levels, preferably by gravity, to any given point or locality of use or storage; to provide receiving, delivery and storing means so arranged and located to receive and transfer the rolls to the desired points, utilizing the weight of the roll to automatically operate such means; to provide such means with controls, preferably manually operated, to effect the transfer of the rolls from one part of the apparatus to any other given part as desired, the minimum amount of labor being required; to provide for a method of handling the rolls by placing each roll in unstable equilibrium or in poised position; moving, as by sliding or rolling, the roll by gravity to another unstable equilibrium or in poised position, and, in the event of first rolling before sliding the roll, then sliding the roll by gravity, and then moving the roll to either a storage place or a point of use; to use in such method, if desired, the step of bringing the roll to a stop after sliding, or if a further point of transfer should be reached after the roll comes to a stop of its own accord, of feeding the roll to the given or desired point or station where the roll may be moved or rolled or tipped, or otherwise handled to store the roll or use it immediately for the press; and, to provide for such other objects, advantages and capabilities as may hereafter appear and are inherently possessed by the invention.

By the term "poised" as herein used, is meant a condition or position of a means which normally is at rest or in substantially level position, but when released or acted upon by a weight, will move from its normal position of rest and become unbalanced, as by rocking, tipping or the like, and will return to its normal position of rest when the force or means causing the change of position no longer affects it.

In the drawings showing illustrative embodiments of the invention.

Referring more particularly to the drawings, the apparatus chosen to illustrate the invention, comprises receiving, delivery and storing supports, of which the receiving support comprises a supporting member 1, preferably in the form of a platform upon which a hand truck 2 of suitable construction may be located, together with a roll 3 for transfer to the delivery support. The platform 1 is located in a recess 4 suitably provided in the floor 5 of the receiving platform or pier of the plant. This platform or pier may be located at the side of railroad tracks, or a highway where motor trucks may obtain access to the platform or adjacent a waterway where boats and ships may have access to the platform.

Figures 2, 3:
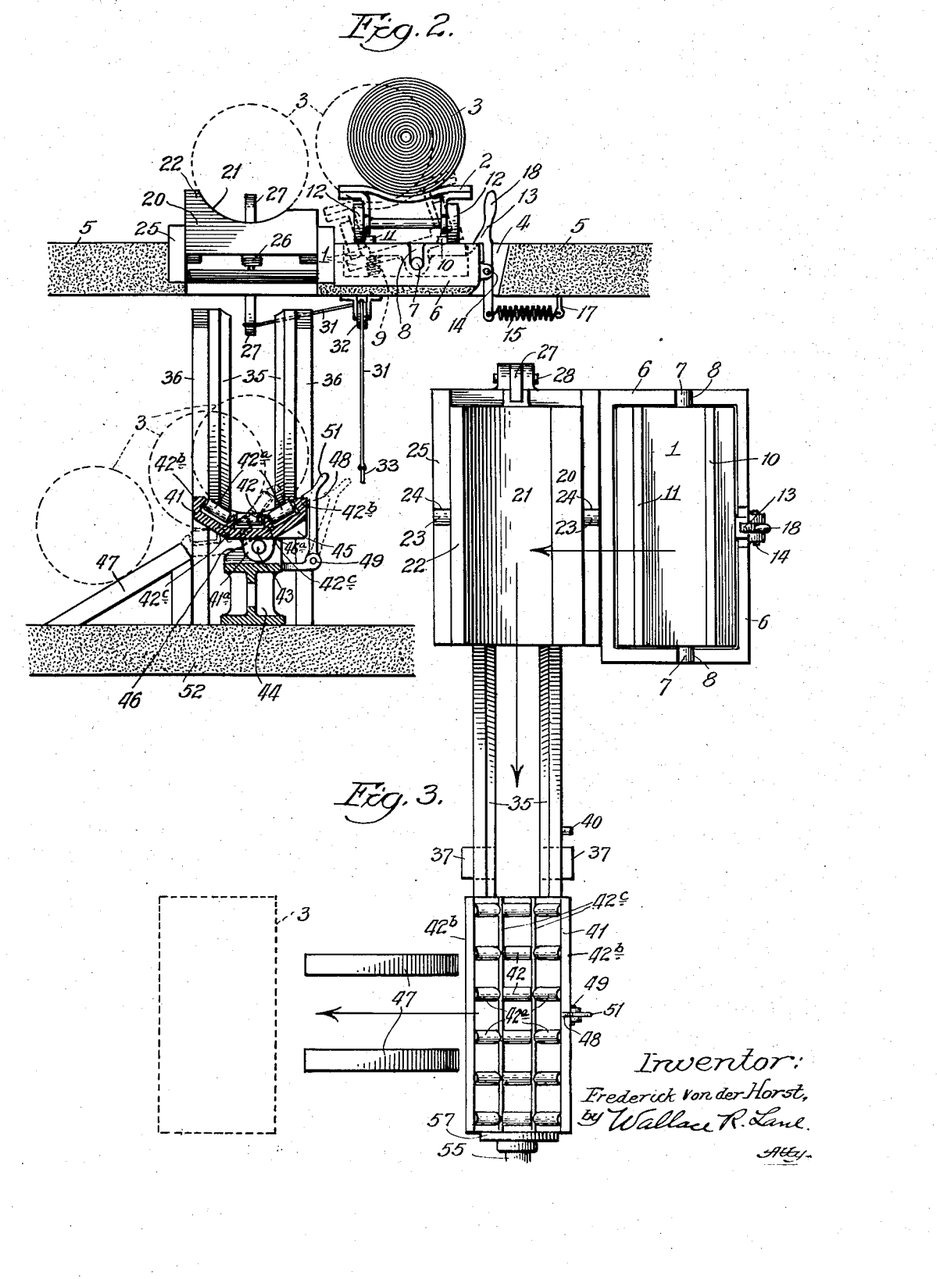
Fig. 2 is an end view of the same.
Fig. 3 is a top plan view of the same omitting the floors.

The platform 1 is rockably supported in a frame member 6 secured in the recess 4 of the floor 5, by means of a pair of trunnions 7 rigid with the support and being rotatably received in bearing slots 8 in the end walls of the frame 6, as clearly shown in Figs. 2 and 3 of the drawings. The trunnions are preferably located at one side of the longitudinal center line of the support 1 in order that the support will be off center, unbalanced or eccentric with respect to the axis of the trunnions so that the supporting member 1 will have a tendency to rock or tip about the axis of the trunnion at one side thereof. Beneath the platform 1 is located a suitable number of springs 9 which normally act to move the platform back to horizontal position after the same has been tipped or rocked. Upon the platform 1 is also provided a pair of ribs 10 and 11 so located and arranged that the wheels 12 of the truck will lie just outside of the ribs 10 and 11 when the truck is upon the platform 1, and also act to guide the truck into proper position upon the platform 1 when the truck and the rolls are brought thereupon. These ribs act to prevent the truck from moving laterally when the platform tips or rocks with the truck and roll at the time when the roll is to be transferred to the delivering support.

Normally the platform 1 is held in horizontal position against tipping by means of a suitable latch 13 having a pivotal connection 14 with the frame 6 and connected at one end of the latch by means of a spring 15 secured to a pin 17 fixed in the floor 5. The latch has a handle 18 by which the latch may be moved to release its locking engagement from the edge of the platform 1 to permit the platform to tip or rock under the weight of the roll and truck at the desired instant. The weight of the truck alone is not sufficient to tip the platform, but the weight of the roll with or without the truck is sufficient to tip the platform and to permit the roll to move or roll laterally upon the delivery support located at one side of the receiving support.

The delivery support comprises a supporting member 20 located laterally adjacent to the platform 1 and at a level suitable to receive the roll 3 when it moves laterally from the truck 2 so that the roll 3 will move upon the support 20 by gravity as the platform 1 and the truck 2 are caused to tip or rock under the weight of the roll, the progress of the roll being shown by dotted lines in Fig. 2 of the drawings. The member 20 has a concave recess 21 shaped to properly fit or receive the roll 3 and also has a guard portion 22 to prevent the roll, by reason of its momentum, from continuing to roll and possibly fall off of the member 20. This supporting member 20 has a pair of trunnions 23 rotatably supported in bearings 24 formed in side members of the frame 25 secured in a recessed portion of the floor 5, as clearly shown in Fig. 1 of the drawings. It will be noted that these trunnions are also located off center or to the rear of the transverse medial plane of the member 4 so that the forward end of the member 20 will be off center so as to tip in one direction as indicated by the dotted line position of the member 20 in Fig. 1 of the drawings. This member tips in a longitudinal direction rather than laterally, and to aid in bringing it back to normal level position after the roll has tipped the member 20 and been transferred therefrom, one or more springs 26 or one or more counter weights 26' or both can be provided, such springs being connected to the bottom of the member 20 and to the frame 25 or the floor 5, as desired, and the weights being secured to the bottom of an end of the member 20.

Normally the member 20 is held in horizontal position by a locking device comprising a latch 27 having pivotal connection 28 with an end of the frame 25 and being connected by a spring 29 which in turn is connected to a pin 30 fixed in the floor 5. The spring 29 normally acts to hold the latch 27 in engaged or locked position as clearly shown in Fig. 1 of the drawings. The lower end of the latch is connected by a pull-cord 31 or the like, passing over a pulley 32 supported by the floor 5, and extending to a handle 33 located at a convenient position for an operator on the lower floor when he desires to release the member 20 so that it may tip and deliver the roll of paper 3 to the lower floor. The floor 5 has an opening 34 through which the roll is capable of moving when it is transferred from the member 20.

Adjacent to the forward end and below the member 24 is located a guide comprising a pair of tracks or skids 35 suitably supported upon props or struts 36 and 37, and skids 35 being suitably pivoted at 38 and capable of being raised to the dotted line position shown thereof and supported in raised position by hooks 39 connected to the floor 5 and cooperating with pins 40 fastened to the sides of the skids. The upper ends of the skid bars are rearwardly curved to lie below the forward end of the member 20 and cooperate therewith to present a smooth path for the roll from the member 20 to the skid 35 when the member 20 and roll 3 are in tipped position, as shown by dotted lines in Fig. 1 of the drawings. When the member 20 is tipped by reason of the weight of the roll, the roll will automatically slide downwardly along the skids 35 and arrive upon the storing support.

Figure 1:
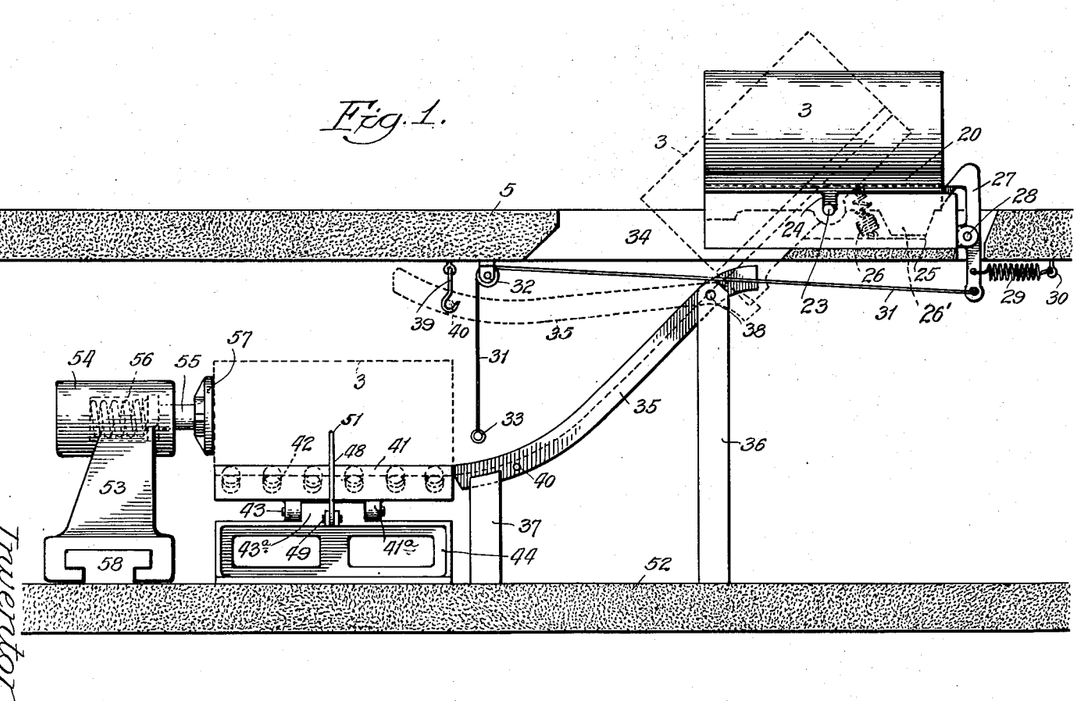
Fig. 1 is a side view in elevation of a part of an apparatus constructed in accordance with the invention and shows the floors in section.
Figure 8:
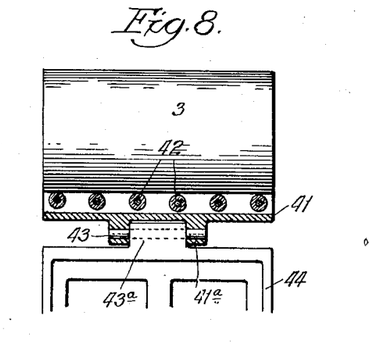
Fig. 8 is a view partly in elevation and partly in section of a storing support of the apparatus.
Figure 9:
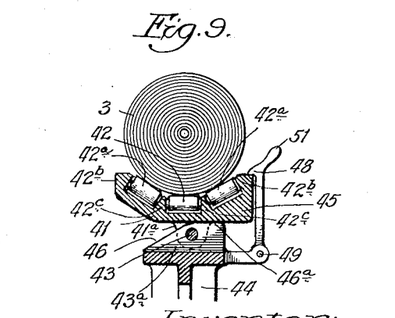
Fig. 9 is a transverse sectional view of the same.

The storing support, of which one is shown in Fig. 1 and a plurality of them shown in Figs. 10, 11, 17 and 18, comprises a rockable supporting member 41 having a rolling receiving portion 42 in alinement with the skids 35 so as to be able to receive the roll as it slides down the skids to the member 41. The concaved portion of this support is provided with a plurality of rollers 42$^a$ arranged in rows at an angle to each other and disposed to support the paper roll at several points. The rolls are freely rotatable on suitable shafts or spindles secured to flanges 42$^b$ and 42$^c$ as clearly shown in Figs. 2 and 3 of the drawings. To the under side of the member 41 is provided a pair of ears 41$^a$ pivotally connected to a shaft 43 supported in a suitable part 43$^a$ of a stand 44. The shaft and ears are located at one side of the longitudinal center line of the supporting member 41 so that the latter, together with the roll 3 thereon, may tip or rock at one side about the axis of the shaft 43. To tip back or return the member 41 to original horizontal position, it is provided with one or more counter weights 45, which also act to normally hold the member 41 in horizontal and receiving position, as clearly shown in Figs. 2, 8 and 9 of the drawings. The weight or weights 45, while sufficient to thus normally hold the member 41 in horizontal position, are, however, insufficient to hold the member in such position under the load of the paper roll. The stand is also provided with inclined surfaces 46 against which the member 41 contacts when the roll is being transferred from the member 41 laterally upon suitable means for carrying the roll to storing position. At the side of the stand 44 is located suitable skids 47 cooperating with the top surface of the member 41 to form a track for the roll so that the roll may automatically roll to a position upon the floor or storing space of the plant, the progress of the roll being shown in dotted lines in Fig. 2 of the drawings. At the top of the stand are provided stops 46$^a$ against which the member 41 hits and rests when returned to horizontal position.

Normally, the platform or member 41 is held in horizontal position by a latch 48 having pivotal connections 49 with the stand 44 and a handle 51 by which the latch may be moved out of engagement, as to the dotted line position thereof shown in Fig. 2, when it is desired to unlock the member 41 so that it will automatically unload the rolls without necessitating the attendance of a workman. In the event that there is already a roll or layer of rolls upon the floor, skids may be located so as to pass over the top of the layer of rolls so that a second layer of rolls may be deposited upon the lower layer.

In order that the roll 3, when it arrives upon the platform member 41 may be properly located for rolling therefrom and not pass too far, a suitable stop may be provided to bring the roll to a standstill or stop in so far as its travel longitudinally on the member 41 is concerned. Such stop comprises a post 53 carrying a head 54 in which is slidably located a bumper member 55 backed by a spring 56 and having an engaging head 57 against which the end of the roll abuts when the roll slides down the skids 35 and along rollers of the member 41, as clearly shown in Figs. 1, 2, 3, 8, 9, 10, 17 and 18 of the drawings. The stop may be moved in or out of position opposite the roll or into the path of travel of the roll, upon a cross track 58 suitably fastened to the floor 52.

Figure 14:
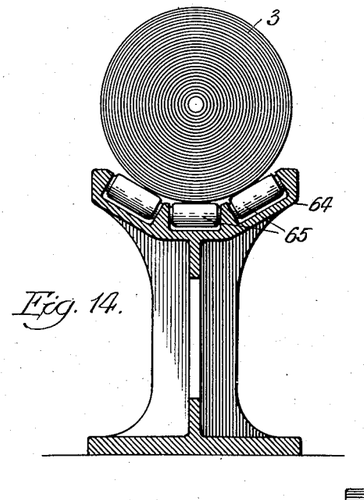
Fig. 14 is a transverse sectional view of the apparatus taken on line 14—14 of Fig. 10.

While one storing support is shown in Fig. 1, it is to be understood that a plurality of such supports may be used as shown in Figs. 10, 11, 17 and 18. These supports are shown and designated by the reference characters 60, 61, 62 and 63 but in construction they are identical to 41 and operate in the same manner. It also is to be understood that between any two supports or stations, 60, 61, 62 or 63 and after the latter, may be located stops similar to that described in connection with Fig. 1 for bringing the rolls to a stop upon the support 41. Between the stations are connected roller guides 64 comprising rollers 65 pivotally supported in flanges 66 as clearly shown in Fig. 14 of the drawings, and arranged as in member 41 so that the roll of paper may be moved with facility to the desired station where it may then be released to be stored at the desired point upon the floor 52. When the roll slides down the skids 35 its momentum may carry it past the support 41, assuming that the stop is now moved out of the passage thereof, and may continue to travel on to stations 60, 61, 62 or 63 or come to a stop at any intermediate point. If the stop device is located at the particular station where the paper roll is to be brought to a standstill, the particular support upon which the roll is brought to a stop may automatically transfer the roll therefrom upon the skids to the storing space, the latch 48 having been previously moved to unlocked position as shown in dotted lines in Fig. 2. On the other hand, if the roll does not travel a sufficient distance, the operator may push the roll along the roller guide 64 to the desired station whereupon it may then be sent to storing space.

Figure 10:
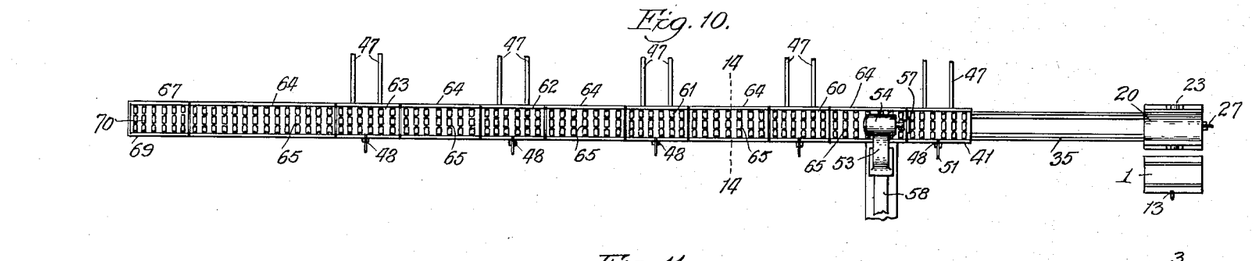
Fig. 10 is a top plan view of the apparatus, omitting the floors, and showing a series of storage supports or stations for moving the rolls to selected or given storage places or points of use.
Figure 11:
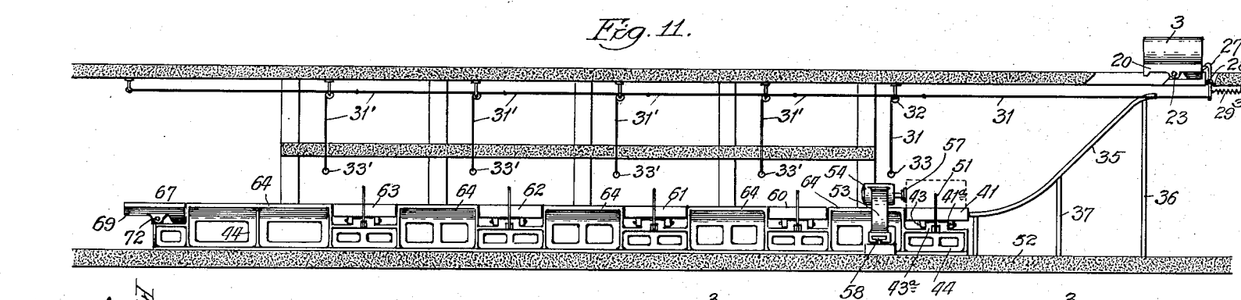
Fig. 11 is a view in side elevation of the same, with the floors in section, and showing the idea of transferring the rolls to a floor of sub-level.
Figure 15:
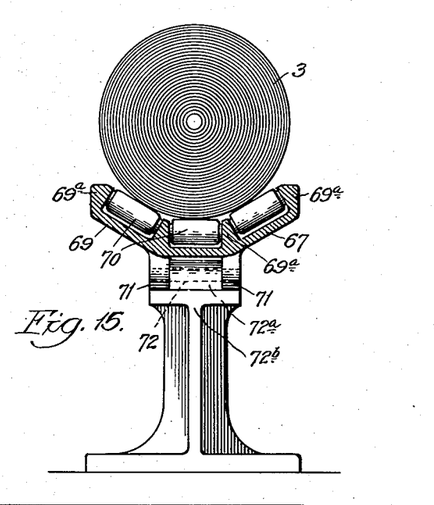
Fig. 15 is a similar view of an end station support.
Figure 16:
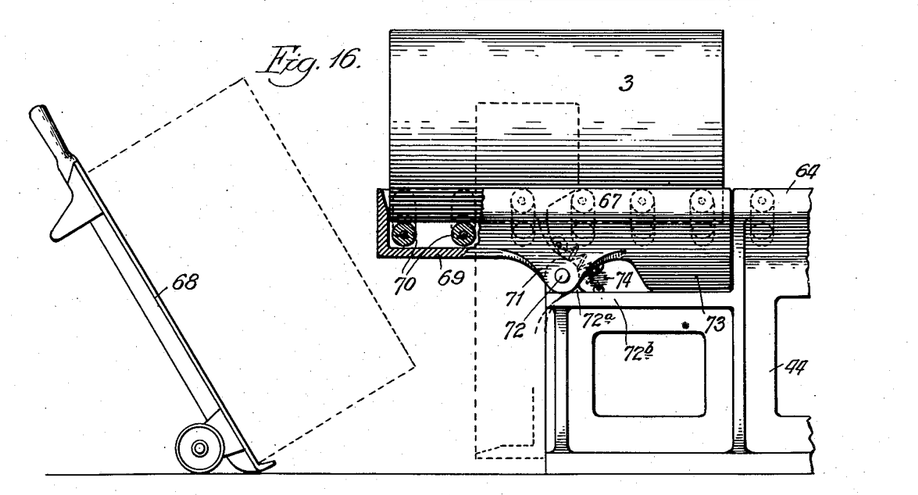
Fig. 16 is a side view of said support and a truck for receiving the paper roll from the support.

At the end of the guide 64 is provided an end station 67 shown in Figs. 10 and 11, and more in detail in Figs. 15 and 16. In this case the roll is tipped endwise so as to stand substantially vertically to be received by a truck 68, as shown by dotted line in Fig. 16 of the drawings. This station comprises a pivotally mounted support or rack member 69 having rollers 70 pivotally mounted between flanges 69ª and arranged as in the members 41, 60, 61, 62, 63 and 64, serving to receive the roll of paper. The frame or rack 69 has depending ears 71 pivotally connected to a shaft 72 supported in a bearing part 72ᵇ of an end portion 72ᵇ of the stand 44. This shaft 72 is located off center, with reference to a transverse medial line, so that the supporting frame 69 may tip automatically under the load of the paper roll, the tipped position of the frame being shown in dotted lines in Fig. 16 of the drawings. To return the support 69 to horizontal and receiving position the support is provided with a counter weight 73, and if desired, also a spring or springs 74 which may act to return the support after the paper roll has been delivered to the truck 68. The weight 73 and spring 74 are only sufficient to return the frame or support 69 and not sufficient to hold the same from tipping under the load of the paper roll. The paper roll may reach, by its own momentum, the station 67, thus eliminating the necessity of an operator pushing the roll thereto, but should the roll stop before reaching the station 67, the operator may feed or push the paper roll to this station until the member 69, under the weight of the paper roll, may tip, and the operator may place a truck in position to receive the paper roll and truck it to the place where the roll is to be used.

For the purpose of aiding in releasing the latch 27 from different stations the pull line 31 may have extensions 31′ and hand rings 33′ conveniently located at respective stations.

Figure 12:
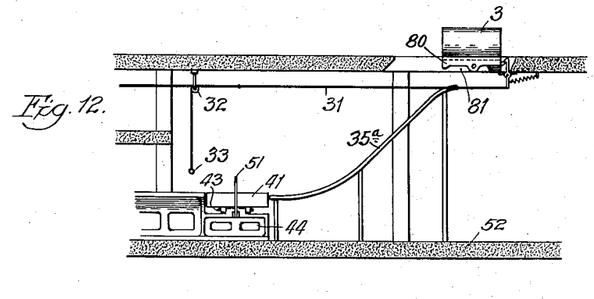
Fig. 12 is a fragmentary view in side elevation of an end of an apparatus for receiving and delivering rolls without the use of a receiving support and with the delivering support acting as the receiving support and being on a floor level.
Figure 13:
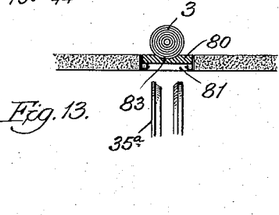
Fig. 13 is a transverse sectional view of the same.
Figure 17:
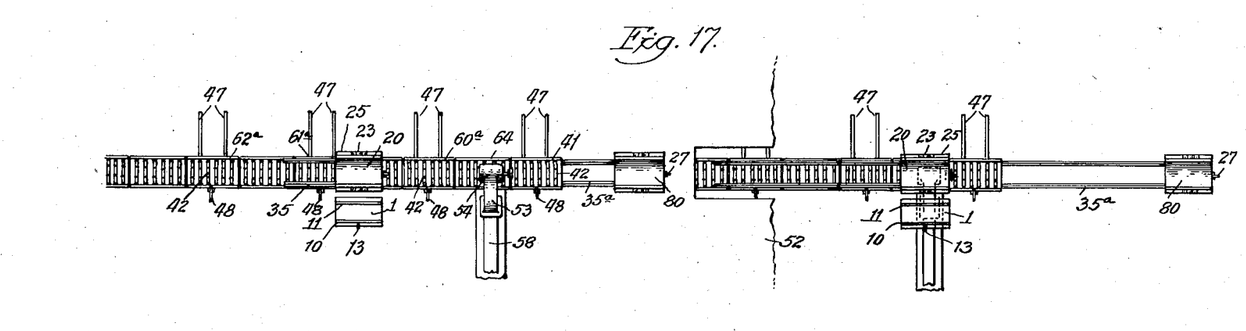
Fig. 17 is a top plan view, omitting the floors, of the apparatus for delivering at different floor levels and with truck or floor level receiving features; and, Fig. 18 is a view in side elevation of the same.
Figure 18:
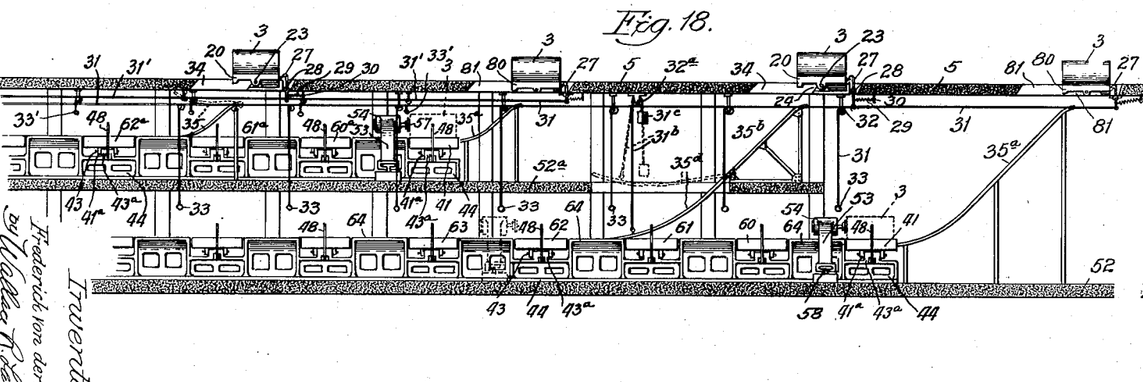

When paper rolls can be delivered at the platform 5 without the need of trucks 2, but can be rolled upon the platform, the tipping support 1 is not necessary, and in such case, the platform 5 may be provided, as shown in Figs. 12, 13, 17 and 18 with a receiving support 80 on the level with the platform 5 and pivotally supported in a recess 81 therein to tip lengthwise as in the case of the support 20, as shown in Figs. 12, 13, 17 and 18 of the drawings. The roll 3 may be rolled directly upon this support 80 and into a concaved part 83 thereof and, when the latch 27 is unlocked, the roll and support will tip and the roll automatically slide down the skids 35ª as in the case of the structure shown in Fig. 1. It is to be understood that both structures, shown in Figs. 1, 2 and 3, and Figs. 12 and 13, may be present in the same platform 5 as shown in Figs. 17 and 18. The structures may also be designed and adapted for delivery and storing of rolls to a plurality of floors, as shown in Figs. 17 and 18, the showing of two floors being merely illustrative of any number of floors. While Figs. 1 to 16 inclusive disclose the application of delivering to and storing on different floors, Figs. 17 and 18 show this in a more complete structure. In the structure thus shown the floor 5 has a plurality of receiving stations of the kind shown and described above in connection with Figs. 1, 2, 3, 10, 11, 12 and 13, with truck receiving supports cooperating with delivery supports 20 for delivery to a sub-floor 52ª or 52 or both, the delivery being to the former by way of skids 35 and to the latter by way of skids 35ᵇ. Both of these skids are designed to be lifted out of the way for the passage of a roll proceeding from a further delivering station, such as the receiving and delivery support 80, the latter being the same as shown in Figs. 10 and 12. Skid 35 is pivoted and held in raised position as shown by dotted lines in Fig. 18. This will permit the delivery of a roll from the support 80 over the skids 35ᶜ and thence over the table or guideway rollers 42 and 65 and beneath the raised skids 35 to the desired storing station. Likewise, skids 35ᵇ have a pivoted section 35ᵈ adapted to deliver rolls from another support 20 and skids 35ᵈ to a sub-floor, and capable of being raised to the dotted line position thereof shown in Fig. 18, for the delivery and transfer of a roll from another delivery support 80 and over skids 35ª and thence over the roller table or guide-way and under the skid portions 35ᵈ, and to the desired point for storing or use. The skid portion 35ᵈ may be raised by a rope or chain or other flexible connector 31ᵇ passing over a pulley 32 and connected to a counter-weight 31ᶜ and hand-pulled sections 31ᵇ having a hand ring 33ª or the like. It will thus be apparent that the rolls may be selectively sent to any desired floor from either a truck or platform delivery means.

Figure 4:
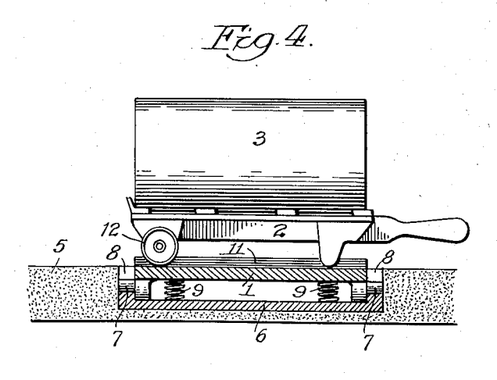
Fig. 4 is a view partly in section and partly in elevation of the receiving support of the apparatus.
Figure 5:
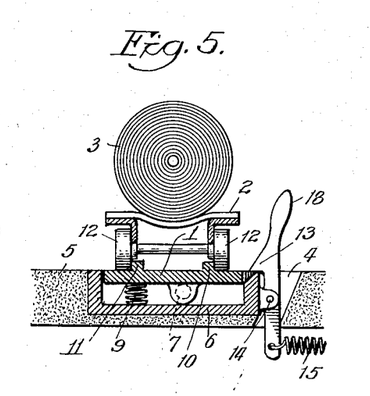
Fig. 5 is a transverse sectional view of the same.
Figure 6:
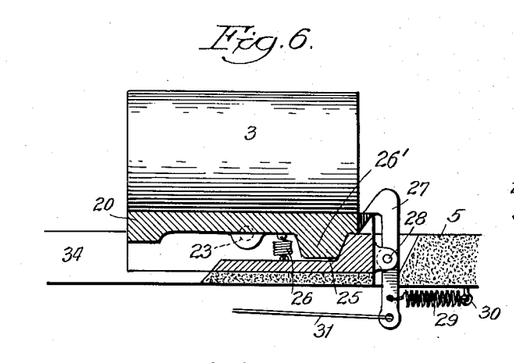
Fig. 6 is a view partly in elevation and partly in section of the delivery support of the apparatus.
Figure 7:
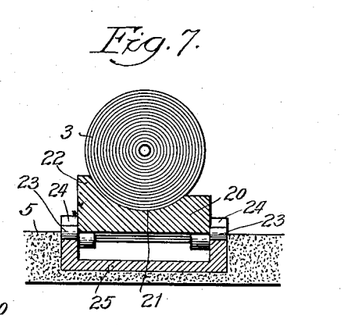
Fig. 7 is a transverse sectional view of the same.

In operation, the paper rolls are usually received at the printing plant in railroad cars or motor trucks or ships which stop adjacent to the side or end of the platform or floor 5. In the event that a motor truck is backed to the side of the platform near the receiving support, it may not be necessary to make use of a truck but merely roll the rolls 3 upon the delivery platform 80 directly without going through the intermediate use of the receiving platform 1. On the other hand, if the motor truck cannot be backed near the receiving platform or if the railroad car or ship is of the type where the paper rolls cannot be rolled therefrom to the platform, but are standing on end in the car or ship, a hand truck is made use of by the operator to carry the roll 3 to the receiving platform. The truck and the roll of paper is then rolled upon the receiving platform 1 and rested into the position shown in Figs. 3, 4 and 5 of the drawings. The operator then operates the latch 13 to release the platform, and the roll, by reason of its weight, automatically tips the platform 1 and rolls the roll upon the platform 20. The ribs 10 and 11 prevent the lateral sliding of the truck. As soon as the roll has left the platform and trucks 1 and 2, the springs 9 automatically return the platform 1 to horizontal position. The roll is now ready to be delivered to a lower floor. Similar conditions exist for support 80 in case when the roll has been rolled directly thereon. The operator on a lower floor, if he is ready to receive the roll, may operate the pull-cord 31 or 31ª to unlock the latch 27 for releasing the support 20 or 80. By reason of the eccentric mounting of the support, and the weight of the paper roll, the support 20 or 80 will automatically tip lengthwise and permit the roll of paper to slide downwardly along the skids 35 or 35ª and upon the storing support 41, or if the bumper stop is out of place, the roll may continue to slide along the guide-way or table 64 and over any one of the stations 60, 61, 62 and 63 and come to a stop at any one of said stations where the bumper may be located. Assuming that the roll has now arrived at the selected station and brought to a stop by a bumper at that station, and that the latch 48 of that station has been thrown out of locking engagement with the station support, the storing supporting member 41, or 61, or 62, or 63 will automatically tip to permit the roll, under its own weight, to be rolled downward over the skids 47 to storing space upon the floor 52 of the plant.

If it be necessary to send the rolls to remote storage, all of the bumpers may be moved out of the path of travel of the roll and the roll permitted to travel to the end station or as far as it will along the guide-way 64 when the operator may then push the roll to the end station 67, where the support thereof may tip under the weight of the roll and the roll be received by the hand truck 68 and trucked away to remote storage.

It is to be noted that these paper rolls may be delivered to more than one lower level of the floor. The same apparatus may be used to deliver to still lower levels if desired.

From the above it will be apparent that the labor of handling paper rolls is considerably reduced and that the transfer of the roll from its receiving point to its destination of use or storage is carried out more or less automatically and with as little manual labor as possible and also without the use of any hoisting means and the like commonly used to carry or transfer paper rolls to the desired points.

While I have herein described and upon the drawings shown illustrative embodiments of the invention with certain details, arrangements of parts and constructions, it is to be understood that the invention is not limited to such details, arrangements of parts and constructions, but that it comprehends other details, arrangements of parts and constructions without departing from the spirit of the invention.

Having now described my invention, I claim:

1. A roll handling apparatus comprising receiving and transfer devices, each of said devices including a movable supporting member, a mounting for normally holding the supporting member in poised condition but permitting the moving of the member under the weight of the roll whereby the roll automatically moves from one to the other of the devices or from the transfer device to a predetermined location.

2. A roll handling apparatus comprising receiving, delivery and storing devices, each of said devices including a movable supporting member, a mounting for normally holding the supporting member in poised condition but permitting the moving of the member under the weight of the roll whereby the roll automatically moves from one to the other of the devices or from the storing device to storage position.

3. A roll handling apparatus comprising receiving and storage devices, each of said devices including a rockable support capable of receiving a roll, a mounting for the support whereby the support may rock under the weight of the roll to discharge the roll from the support.

4. A roll handling apparatus comprising receiving, delivery and storage devices, each of said devices including a rockable support capable of receiving a roll, a mounting for the support whereby the support may rock under the weight of the roll to discharge the roll from the support.

5. A roll handling apparatus comprising receiving, delivery and storage devices, each of said devices including a rockable support capable of receiving a roll, a mounting for the support whereby the support may rock under the weight of the roll to discharge the roll from the support, and means between said devices for guiding the roll from one to the other of said devices or from the storing device to the storing location for the roll.

6. A roll handling apparatus comprising receiving and storing devices, each of said devices including a movable supporting member, a mounting for normally holding the supporting member in poised condition but permitting the moving of the member under the weight of the roll whereby the roll automatically moves from one to the other of the devices or from the storing device to storage position, and means for normally holding the support from movement and operable to release the support and permit it to move under the weight of the roll.

7. A roll handling apparatus comprising receiving, delivery and storing devices, each of said devices including a movable supporting member, a mounting for normally holding the supporting member in poised condition but permitting the moving of the member under the weight of the roll whereby the roll automatically moves from one to the other of the devices or from the storing device to storage position, and a manually operable release device normally holding the receiving support poised and when manually actuated operable to release the support to permit it to move under the weight of the roll.

8. A roll handling apparatus comprising receiving and storing devices, each of said devices including a movable supporting member, a mounting for normally holding the supporting member in poised position but permitting the moving of the member under the weight of the roll whereby the roll automatically moves from one to the other of the devices or from the storing device to storage position, means for normally holding the receiving support from movement and operable to release said support and permit it to move under the weight of the roll, and means for returning the support to poised position after the discharge of the roll.

9. A roll handling apparatus comprising receiving and storing devices, each of said devices including a movable supporting member, a mounting for normally holding the supporting member in poised position but permitting the moving of the member under the weight of the roll whereby the roll automatically moves from one to the other of the devices or from the storing device to storage position, means for normally holding the support from movement and operable to release the support and permit it to move under the weight of the roll, and counter balancing means for automatically moving the support back to receiving position when the weight of the roll is no longer effective on the support.

10. A roll handling apparatus comprising receiving and storing devices, each of said devices including a movable supporting member, a mounting for normally holding the supporting member in poised position but permitting the moving of the member under the weight of the roll whereby the roll automatically moves from one to the other of the devices or from the storing device to storage position, an eccentric mounting for the support whereby when the roll is on the support the weight of the roll will cause the support to tip about its mounting and discharge the roll automatically.

11. A roll handling apparatus comprising receiving, delivery and storing devices, each of said devices including a movable supporting member, an eccentric mounting for the support whereby when the roll is on the support the weight of the roll will cause the support to tip about its mounting and discharge the roll automatically, and means for conveying the discharged roll to another of said devices or to the storage place.

12. A roll handling apparatus comprising receiving and storing devices, each of said devices including a movable supporting member, a mounting for normally holding the supporting member in poised position but permitting the moving of the member under the weight of the roll whereby the roll automatically moves from one to the other of the devices or from the storing device to storage position, an eccentric mounting for the support whereby when the roll is on the support the weight of the roll will cause the support to tip about its mounting and discharge the roll automatically, and means for bringing the discharged roll to a stop at a given point.

13. A roll handling apparatus comprising a receiving device including an off-center pivotal mounting whereby the support may tilt under the weight of the roll to discharge the roll, means for guiding the discharged roll to a second support including an off-center pivotal mounting whereby the second support may tilt under the weight of the roll to discharge the roll to a given location.

14. A roll handling apparatus comprising a receiving support capable of receiving and holding a roll carrier and a roll, means for rockably supporting the receiving support whereby the receiving support may rock under the weight of the roll to discharge the roll from the carrier, a delivery support for receiving the discharged roll and including means for rockably supporting the delivery support whereby the delivery support may rock under the weight of the roll to deliver the roll to a lower level or floor, and means for conveying the delivered roll to storage location.

15. A roll handling apparatus comprising a receiving support capable of receiving and holding a roll carrier and a roll, means for rockably supporting the receiving support whereby the receiving support may rock under the weight of the roll to discharge the roll from the carrier, a delivery support for receiving the discharged roll and including means for rockably supporting the delivery support whereby the delivery support may rock under the weight of the roll to deliver the roll to a lower level or floor, and means for conveying the delivered roll to storage location, and manually controlled means for normally holding said supports against rocking operation and operable to release said supports to discharge and deliver said roll.

16. A roll handling apparatus comprising a receiving support capable of receiving and holding a roll carrier and a roll, means for rockably supporting the receiving support whereby the receiving support may rock under the weight of the roll to discharge the roll from the carrier, a delivery support for receiving the discharged roll and including means for rockably supporting the delivery support whereby the delivery support may rock under the weight of the roll to deliver the roll to a lower level or floor, and means for conveying the delivered roll to storage location, and means for automatically returning the supports to pre-rocked positions after the weight of the roll is no longer effective upon the supports.

17. A roll handling apparatus comprising a receiving support capable of receiving and holding a roll carrier and a roll, means for rockably supporting the receiving support whereby the receiving support may rock under the weight of the roll to discharge the roll from the carrier, a delivery support for receiving the discharged roll and including means for rockably supporting the delivery support whereby the delivery support may rock under the weight of the roll to deliver the roll to a lower level or floor, and means for conveying the delivered roll to storage location, manually controlled means for normally holding said supports against rocking operation and operable to release said supports to discharge and deliver said roll, and counter balancing means for restoring the supports to pre-rocked position upon the removal of the roll from the suports.

18. In roll handling apparatus the combination with a tiltable roll delivery member adapted when tilted to deliver the roll for movement by gravitation to a lower level of a receiving support comprising a platform capable of receiving a truck carrying a roll, eccentrically located pivots for the platform whereby the platform may tip about said pivots under the weight of the roll to discharge the roll from the truck onto said delivery member, and means for holding the truck from moving when the platform is tipped.

19. In roll handling apparatus the combination with a tiltable roll delivery member adapted when tilted to deliver the roll for movement by gravitation to a lower level of a receiving support comprising a platform capable of receiving a truck carrying a roll, eccentrically located pivots for the platform whereby the platform may tip about said pivots under the weight of the roll to discharge the roll from the truck, onto said delivery member, and means for holding the truck from moving when the platform is tipped, and counter-balancing means acting against the platform to return it to pre-tipped position.

20. In roll handling apparatus, a receiving support comprising a platform capable of receiving a truck carrying a roll, eccentrically located pivots for the platform whereby the platform may tip about said pivots under the weight of the roll to discharge the roll from the truck, and means for holding the truck from moving when the platform is tipped, and springs engaging the platform and acting to automatically tip back the platform after the roll has been discharged.

21. In roll handling apparatus, the combination with a tiltable roll delivery member adapted when tilted to deliver the roll for movement by gravitation to a lower level of a receiving support comprising a platform capable of receiving a truck carrying a roll, eccentrically located pivots for the platform whereby the platform may tip about said pivots under the weight of the roll to discharge the roll from the truck onto said delivery member, means for holding the truck from moving when the platform is tipped, and release means normally holding the platform against tipping and operable to release the platform to permit it to tip.

22. In roll handling apparatus the combination with a tiltable roll delivery member adapted when tilted to deliver the roll for movement by gravitation to a lower level of a receiving support comprising a platform capable of receiving a truck carrying a roll, eccentrically located pivots for the platform whereby the platform may tip about said pivots under the weight of the roll to discharge the roll from the truck onto said delivery member, means for holding the truck from moving when the platform is tipped, release means normally holding the platform against tipping and operable to release the platform to permit it to tip, and means for automatically tipping back the platform to pre-tipped position after the roll has been discharged.

23. In a roll handling apparatus, a support comprising a roll receiving and holding member, an eccentric mounting for said member whereby the weight of the roll will automatically cause the member to tip to discharge or deliver the roll from said member, said member having a guard for positioning the roll on the member and for preventing the roll from rolling off of the member.

24. In a roll handling apparatus, a support comprising a roll receiving and holding member, an eccentric mounting for said member whereby the weight of the roll will automatically cause the member to tip to discharge or deliver the roll from said member, and release means for normally holding the member from tipping and being operable to release said member whereby the member will tip under the weight of the roll.

25. In a roll handling apparatus, a support comprising a roll receiving and holding member, an eccentric mounting for said member whereby the weight of the roll will automatically cause the member to tip to discharge or deliver the roll from said member, release means for normally holding the member from tipping and being operable to release said member whereby the member will tip under the weight of the roll, and counter-balancing means for returning the member to pre-tipped position after the roll leaves the member.

26. Roll handling apparatus comprising a receiving floor having means for receiving a roll and delivering it through an opening in the floor to floors at lower levels, means for guiding the roll to said lower levels, roll receiving members at given points at said lower levels, means for bringing the roll to a stop at any given point upon any of said members, said members being operable to discharge the roll for storing.

27. In roll handling apparatus, the combination of a rocker support pivotally mounted upon a receiving floor and movable under the weight of a roll placed thereon to discharge the roll, inclined tracks upon which the roll is adapted to be discharged and to slide endwise to a lower floor or level, and a substantially horizontal support upon said lower floor or level, upon which said roll is adapted to be received and to come to rest and from which it may be rolled sidewise to a predetermined point.

28. In roll handling apparatus, the combination of a rocker support pivotally mounted upon a receiving floor and movable under the weight of a roll placed thereon to discharge the roll, inclined tracks upon which the roll is adapted to be discharged and to slide endwise to a lower floor or level, and a substantially horizontal support upon said lower floor or level upon which said roll is adapted to be received and to come to rest and from which it may be rolled sidewise to a pre-determined point, said horizontal support being adapted to support the roll substantially above the floor level to facilitate rolling the same by gravity to the desired location.

29. In roll handling apparatus, the combination of a rocker support pivotally mounted upon a receiving floor and movable under the weight of a roll placed thereon to discharge the roll, means normally holding said support against tilting, release means whereby an operator may release the support for tilting under the weight of the roll, inclined tracks upon which the roll is adapted to be discharged and to slide endwise to a lower floor or level, and a substantially horizontal support upon said lower floor or level upon which said roll is adapted to be received and to come to rest and from which it may be rolled sidewise to a pre-determined point.

30. The method of handling rolls which consists in placing a roll in unbalanced condition on a support, moving said support to inclined position, thus causing the roll to roll into a position for sliding endwise to a lower level along tracks leading to the lower level and onto a substantially horizontal support, and thereafter rolling the roll from said horizontal support to a predetermined location.

31. The method of handling rolls which consists in placing a roll in unbalanced condition on a support, moving said support to inclined position thus causing the roll to roll into a position for sliding to a lower level and to a second support, moving said second support to inclined position thus causing the roll to slide by gravitation to the lower level, and thereafter rolling the roll to a predetermined location.

32. The method of handling rolls which consists in placing a roll in unbalanced condition on a support, moving said support to inclined position thus causing the roll to move by gravitation to a lower level, stopping the roll at a given point and on a second support, and thereafter moving said second support to inclined position to cause the roll to move by gravitation to a predetermined location.

33. The method of handling rolls which consists in placing a roll in unbalanced condition on a support, moving said support to inclined position thus causing the roll to move by gravitation to a lower level, advancing the roll to a given point and onto a second support, and thereafter moving said second support to inclined position to cause the roll to move by gravitation to a predetermined location.

34. The method of handling rolls which consists in placing a roll in unbalanced condition on a support, moving said support to inclined position thus causing the roll to move by gravitation into a second position in which it is in unbalanced condition and upon a support, moving said support therefor to inclined position to cause the roll to slide by gravitation to a lower level, bringing the roll to a stop at a given point, and moving the roll by gravitation to a predetermined location.

35. The method of handling rolls which consists in placing a roll in unbalanced condition an a support, moving said support to inclined position thus causing the roll to move by gravitation into a second position in which it is in unbalanced condition and upon a support, moving said second support to inclined position thus causing the roll to slide by gravitation to a lower level, advancing the roll to a selected point for movement to a place of storing or use and upon a support, and thereafter moving said third support to inclined position to cause the roll to move by gravitation to a predetermined location.

In witness whereof, I hereunto subscribe my name to this specification.

FREDERICK von der HORST.